(12) United States Patent
Kim et al.

(10) Patent No.: US 7,080,293 B2
(45) Date of Patent: Jul. 18, 2006

(54) ERROR CORRECTION CODING METHOD FOR A HIGH-DENSITY STORAGE MEDIA

(75) Inventors: Dae Young Kim, Seoul (KR); Changhyun Eo, Seoul (KR)

(73) Assignee: LG Electronics Inc., Seoul (KR)

( * ) Notice: Subject to any disclaimer, the term of this patent is extended or adjusted under 35 U.S.C. 154(b) by 207 days.

(21) Appl. No.: 09/780,360

(22) Filed: Feb. 12, 2001

(65) Prior Publication Data

US 2003/0061551 A1    Mar. 27, 2003

(30) Foreign Application Priority Data

Feb. 12, 2000    (KR) ................. 2000-6698

(51) Int. Cl.
*G06F 11/00* (2006.01)
*G11B 7/24* (2006.01)

(52) U.S. Cl. .................... 714/701; 369/275.3
(58) Field of Classification Search ............... 714/701, 714/755–758, 761–763, 769, 752; 365/129; 369/275.3; 386/126
See application file for complete search history.

(56) References Cited

U.S. PATENT DOCUMENTS

| | | | | |
|---|---|---|---|---|
| 4,972,417 A * | 11/1990 | Sako et al. | ................. | 714/755 |
| 5,140,596 A * | 8/1992 | Weldon, Jr. | ................. | 714/762 |
| 5,546,409 A * | 8/1996 | Karasawa | .................... | 714/755 |
| 5,901,157 A * | 5/1999 | Hogan | ......................... | 714/784 |
| 6,052,815 A * | 4/2000 | Zook | ........................... | 714/758 |
| 6,079,046 A * | 6/2000 | Tamura et al. | .............. | 714/781 |
| 6,223,322 B1 * | 4/2001 | Michigami et al. | ......... | 714/769 |
| 6,363,511 B1 * | 3/2002 | Massoudi | ................... | 714/755 |
| 6,378,103 B1 * | 4/2002 | Han | ........................... | 714/769 |
| 6,430,723 B1 * | 8/2002 | Kodama et al. | ............ | 714/770 |
| 6,539,512 B1 * | 3/2003 | Jeong et al. | ................. | 714/752 |
| 6,621,782 B1 * | 9/2003 | Nakane et al. | ............. | 369/53.1 |

* cited by examiner

*Primary Examiner*—Guy Lamarre
*Assistant Examiner*—Cynthia Britt
(74) *Attorney, Agent, or Firm*—Birch, Stewart, Kolasch & Birch, LLP

(57) ABSTRACT

The present invention relates to an error correction encoding method for a high-density storage medium. This method arranges sequential input data so as to form a plurality of data blocks of a predefined matrix form, the plurality of data blocks being made sequentially, appends outer parity to each column of each data block in the column direction, appends inner parity to each row of each of the outer-parity-encoded data block in the row direction, reorders rows including outer parity so as to insert them separately into the other rows including no outer parity for each of the outer- and inner-parity-encoded data blocks, and writes rows in the same order in the reordered data blocks to a storage medium sequentially on row-by-row basis.

28 Claims, 3 Drawing Sheets

1 ECC Block = 37,586 Bytes

BACKGROUND ART $i = b / 172$
$j = b - 172 * i$ $s = p*364+q \quad s = r*364+t+182$

ERROR CORRECTION CODING METHOD FOR A HIGH-DENSITY STORAGE MEDIA

BACKGROUND OF THE INVENTION

1. Field of the Invention

The present invention relates to an error correction encoding method for a high-density storage media

2. Description of the Related Art

Data on a digital versatile disk (DVD) are generally encoded in a predefined error correction code (ECC). The ECC code is the two-dimensional Reed-Solomon code (hereinafter, referred to RS code) using an outer parity (PO) encoder and an inner parity (PI) encoder. Data bytes to be written in a disk are arrayed in rows and columns to be PO- and PI-encoded.

FIG. 1 shows the format of an ECC block in accordance with the DVD standard format. Data unit input to the RS encoder is (172×192) -symbols (a symbol size may be one byte ) in size and has a block structure of a 172 columns by 192 rows matrix form. For every column of the input data block, the PO encoder appends outer parity of sixteen bytes to a 192-byte column in the column direction. The outer-error-correction encoded columns, each being 208-byte long, are then stored in a buffer of the RS encoder.

After outer-error-correction encoding of 172 columns is completed, 172 columns become arranged sequentially in the buffer. Then, for every row of the data block in the buffer, inner-error-correction encoding is performed sequentially by the PI encoder by appending inner parity of ten symbols to a 172-symbol row in the row direction.

In this way, the RS encoder produces the ECC block shown in FIG. 1. As a result, the ECC block is 37,586 bytes in size (182×208=37,586). Each symbol of the ECC block is then modulated by ESM (Eight to Sixteen Modulation) method, which converts 8 bits (one byte) to 16channel bits so as to be written onto a storage medium like DVD.

The error correction encoding method using ECC block structure shown in FIG. 1 has been devised based on data density of current optical disks like DVD. It is, however, expected that for next-generation storage media of higher data density than DVD the error correction encoding method of the conventional art is vulnerable to burst errors.

It will be likely that next-generation high-density storage medium, the density of which is twice as high as DVD, has two times more channel bit errors than DVD for a scratch of the same size. Therefore, the development of an effective error correction encoding method is required to enhance the capability of correction of burst errors on next-generation high-density storage media.

SUMMARY OF THE INVENTION

A general objective of the present invention is to solve the above-mentioned problems and to provide an error correction encoding method of improving the error correction capability for high-density storage media and reading/writing devices for the high-density storage media.

The error correction encoding method for a high-density storage medium according to an aspect of the present invention, comprises the steps of: arranging sequential input data so as to form a plurality of data blocks of a predetermined matrix form, the plurality of data blocks being made sequentially, appending outer parity of a predetermined size to each column of each data block in the column direction, appending inner parity of a predetermined size to each row of each of the outer-parity-encoded data block in the row direction, reordering rows including outer parity so as to insert them separately into the other rows including no outer parity for each of the outer-and inner-parity-encoded data blocks, and reading out rows in the same order in the resulting data blocks sequentially and writing them to said storage medium on row-by-row basis.

The method of the present invention can be used in error correction for higher density storage media than DVD and reading/writing apparatus for higher density storage media. Also, the error correction encoding method according to the present invention is easy to implement on existing DVD recorders, thereby enabling to develop players capable of reproducing storage media of two types, or DVD and next-generation high-density storage medium, with less hardware development and production cost.

BRIEF DESCRIPTION OF THE DRAWINGS

The accompanying drawings, which are included to provide a further understanding of the invention, illustrate a preferred embodiment of this invention, and together with the description, serve to explain the principles of the present invention.

In the drawings.

DESCRIPTION OF THE PREFERRED EMBODIMENTS

The preferred embodiments of the present invention will be described in detail referring to the accompanying drawings.

Figure 1:
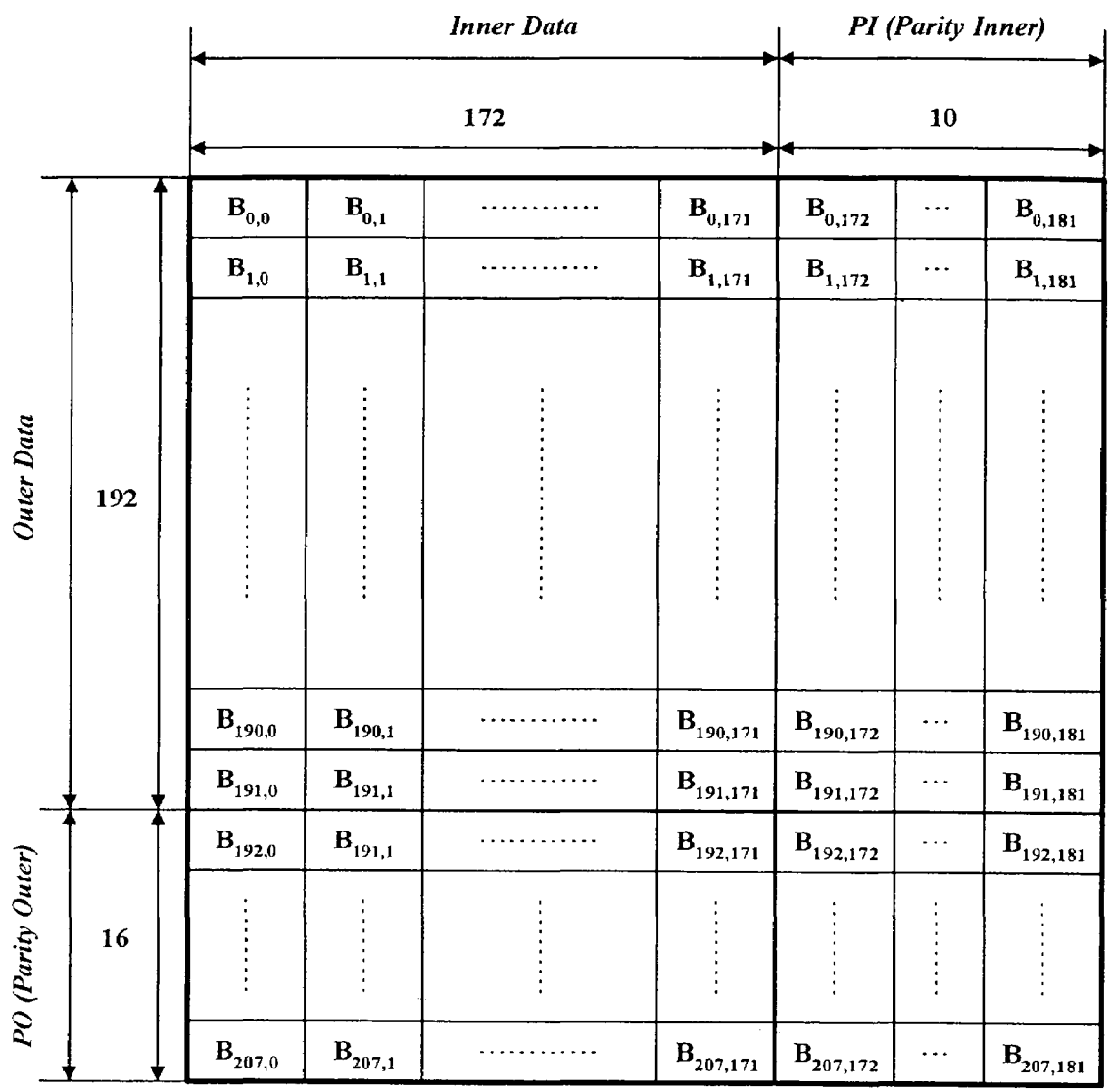
FIG. 1 shows an ECC block structure using a two-dimensional Reed-Solomon code according to the Background Art.
Figure 2:
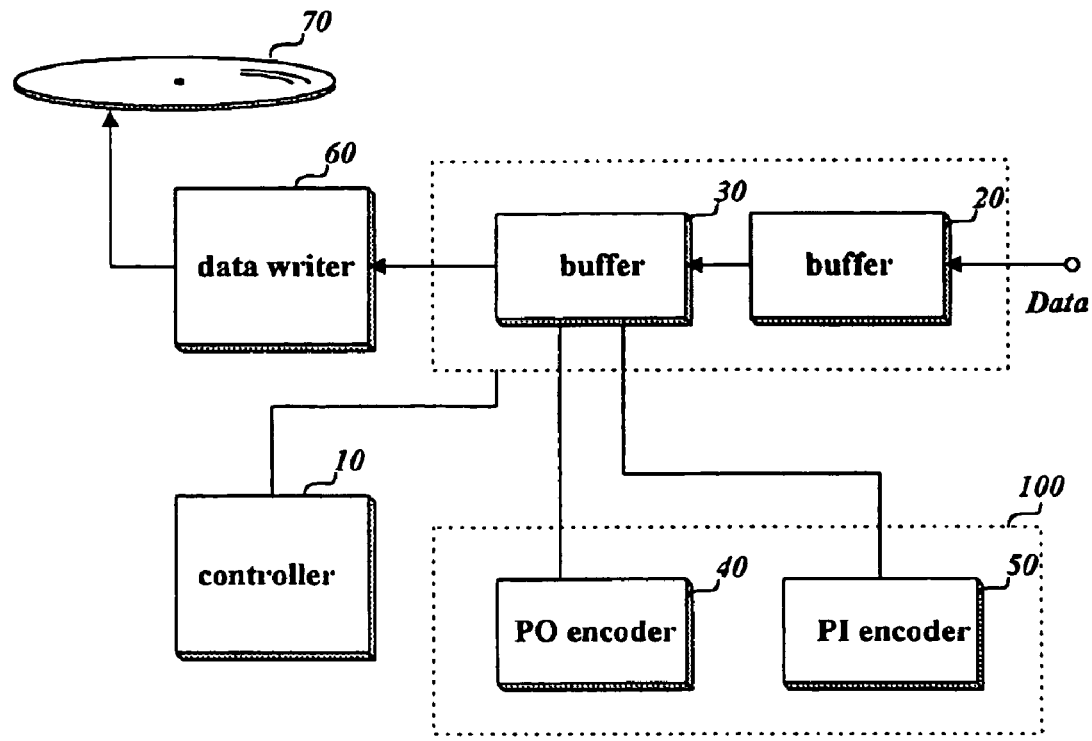
FIG. 2 is a block diagram of a data writing apparatus embodying the present invention.

FIG. 2 depicts a block diagram of a data writing apparatus according to an embodiment of the present invention. As shown in FIG. 2, the data writing apparatus comprises a controller 10 for controlling constituting components; a first buffer 20 for arranging input digital data that are sequentially inputted so as to form data blocks of a predetermined matrix form (hereinafter, unit block), and producing a pair of unit blocks, i.e., a first unit block and a second unit block, in the input order, under control of controller 10; a second buffer 30 for temporarily storing, under control of controller 10, the pair of unit blocks transmitted from the first buffer 20; an error correction encoding unit 100 having an outer parity (PO) encoder 40 for appending outer parity of a predetermined number of bytes, in the column direction, to each column of the pair of unit blocks and an inner parity (PI) encoder 50 for appending inner parity of a predetermined number of bytes, in the row direction, to each row of the pair of the outer-parity-encoded unit blocks that have been temporarily stored in second buffer 30; and a data writer 60 for reading out rows in the same order in the pair of the resulting unit blocks sequentially from second buffer 30 and writing the read-out rows into a high-density storage medium on row-by-row basis under control of controller 10.

With reference to the data writing apparatus of FIG. 2, the error correction encoding method according to the present invention will be described below in detail.

Figure 3:
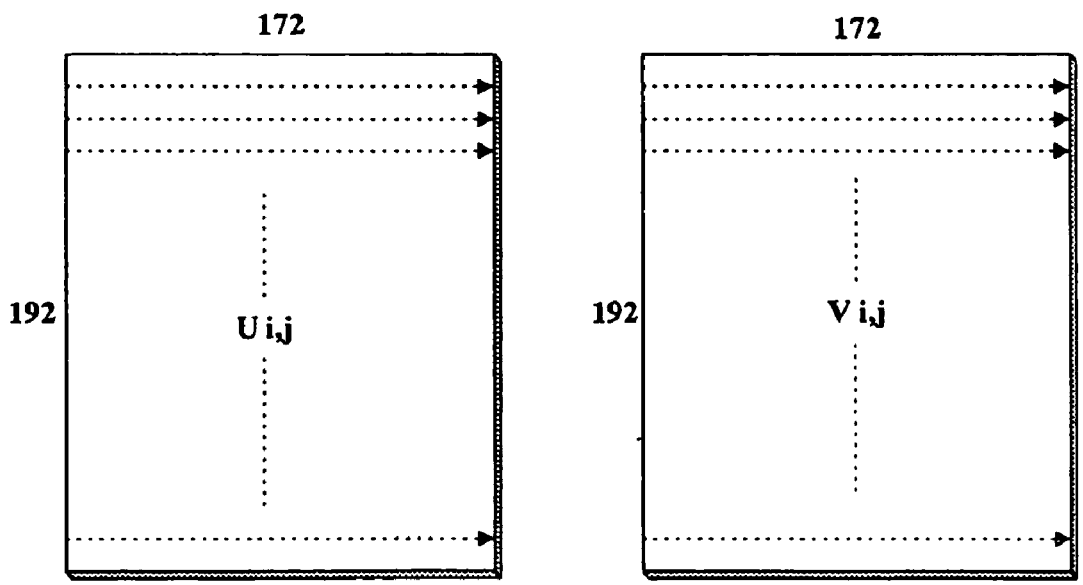
FIG. 3 shows formats of data blocks that are used in the error correction encoding method according to the present invention.

Digital data sequentially inputted to first buffer 20 are arranged in a manner that a pair of unit blocks, U(i,j) and V(i,j) shown in FIG. 3 are formed in first buffer 20, in the order as stated, under control of controller 10. Each unit block has 192 rows, each being 172-byte long. That is, each unit block is 33,024 bytes (172×192 bytes) in size. A pair of unit blocks, U(i,j) and V(i,j) are formed by arranging input data of 66,048 bytes. Specifically, letting row and column position in an unit block be represented by i and j, where 0<=i<=191 and 0<=j<=171 and an order in which bytes in the input data of 33,024 bytes are sequentially inputted be represented by b, where 0 <=b<=(192×172)−1, each unit block is made by using the equations: i=b/172 and j=b−(172×i).

Once the generation of a pair of unit blocks, U(i,j) and V(i,j) is completed, the two unit blocks are transmitted from first buffer 20 to second buffer 30 under control of controller 10. On the other hand, controller 10 repeatedly controls first buffer 20 such that another pair of unit blocks are formed in first buffer 20 by arranging the sequential input data.

Figure 4:
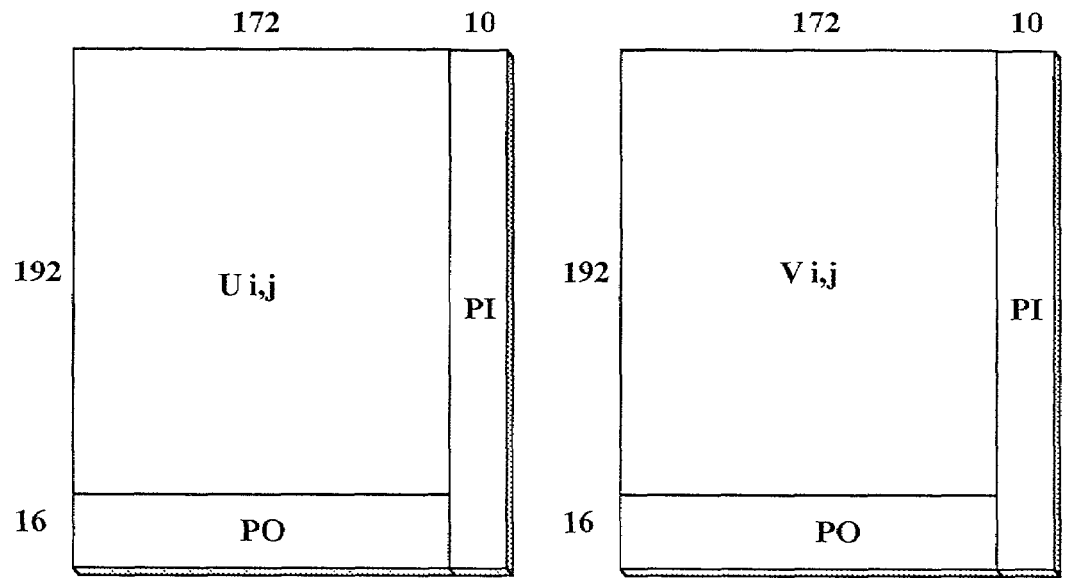
FIG. 4 shows data blocks of FIG. 3 after outer- and inner-error-correction encoding.

First, the first unit block U(i,j) in second buffer 30 is outer-error-correction encoded by PO encoder 40. That is, for every column of U(i,j), PO encoder appends outer parity of sixteen bytes to a 192-byte column in the column direction. Then, for every row of the resulting U(i,j), which has 208 rows, PI encoder 50 appends inner parity of ten bytes to a 172-byte row in the row direction. The same error-correction-encoding is carried out for second unit block V(i,j). FIG. 4 shows a pair of RS-encoded unit blocks, each resulting in (182×208) bytes in size.

After that, for encoded unit blocks U(i,j) and V(i,j) shown in FIG. 4, the sixteen rows including outer parity are reordered in order to insert them separately among the other 192 rows including no outer parity in such a way that one row including outer parity is positioned after every other twelve rows including no outer parity. By doing this, outer parities are prohibited from being damaged at a burst.

Figure 5:
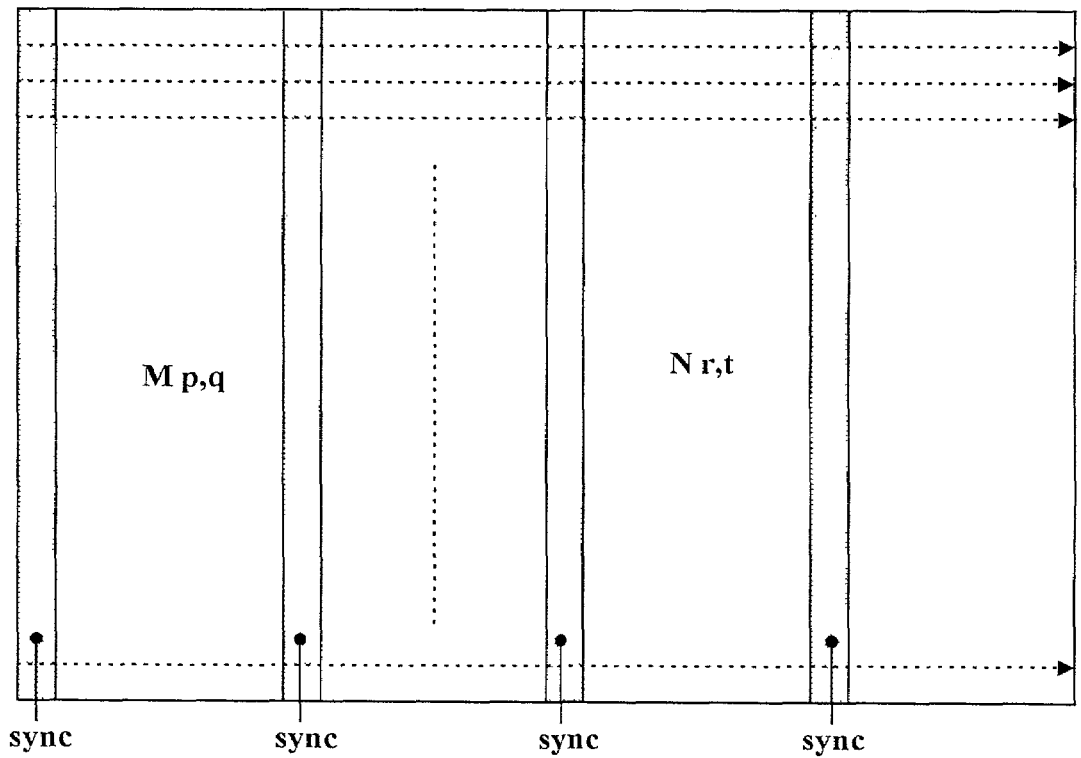
FIG. 5 illustrates a way in which two data blocks shown in FIG. 4 are written to a storage medium.

As shown in FIG. 5, the resulting unit blocks U(i,j) and V(i,j) are combined in such a manner that rows in the same order correspond to each other, thereby forming one combined block. Then, sync data is generated and inserted into appropriate positions of each row of the combined block. Finally, under control of controller 10 data writer 60 reads out data in one row of the combined block at a time from second buffer 30, as shown in FIG. 5 and modulates and writes the row including 364-byte data and inserted sync data onto high-density storage medium 70 sequentially. Such writing operation is repeated until 208 rows of the combined block are written onto high-density storage medium 70.

To be more specific, let (row, column) positions in the two unit blocks, M(p,q) and N(r,t) shown in FIG. 5 that underwent error-correction encoding and reordering of outer parity rows be represented by (p,q) and (r,t), respectively, where 0<=p, r<=207 and 0<=q, t<=181, and an order in which bytes in the combined block of FIG. 5 are sequentially written to storage medium 70 be represented by s, where 0<=s<=(182×208×2)−1. In the writing operation, data to be read out from the unit blocks M(p,q) and N(r,t) is determined by the following equations: s=p×364+q and s=r×364+t+182.

The foregoing is provided only for the purpose of illustration and explanation of the preferred embodiment of the present invention, so changes, variations and modifications may be made without departing from the spirit and scope of the invention.

What is claimed is:

1. A method for processing digital data for use with a storage medium, comprising the steps of:
arranging input digital data so as to form a plurality of data blocks of a predetermined matrix form;
appending outer parity of a predetermined size and inner parity of a predetermined size to each column and row of each of said plurality of data blocks, respectively, and combining the plurality of data blocks as appended into one ECC (Error Correction Code) block subject to error correction;
reordering rows including the outer parity so as to insert said rows including the outer parity separately into other rows including no outer parity, for each of said plurality of data blocks in said appending step; and
writing sequentially rows having the same row number in said plurality of data blocks re-arranged in said reordering step, to the storage medium.

2. The method according to claim 1, wherein in said arranging step, each of said plurality of data blocks is formed by using the following equations:

$$i=b/X \text{ and}$$

$$j=b-(X \times i),$$

where i and j $(0 \leq i \leq (Y-1)$ and $0 \leq j \leq (X-1))$ represent row and column position in each data block of (X×Y)-byte size, respectively, where b $(0 \leq b \leq (X \times Y)-1)$ represents an order in which the bytes in said input data of (X×Y)-byte size are inputted, and where X and Y are integers greater than 1.

3. The method according to claim 2, wherein X is 172 and Y is 192.

4. The method according to claim 3, wherein said outer parity is 16-byte long in each column and said inner parity is 10-byte long in each row.

5. The method according to claim 1, wherein said appending step comprises of the sub-steps of:
appending said outer parity of a predetermined size to each column of each of said plurality of data blocks in the column direction; and
appending said inner parity of a predetermined size to each row of each of said plurality of data block outer-parity-encoded in said outer parity appending step in the row direction.

6. The method according to claim 1, wherein in said writing step, said plurality of data blocks include N(N≦2) data blocks, each being (J×K)- bytes in size, and a byte at (R(i), C(i)) of the i-th data block is selected and written to said storage medium based on the following equations:

$$S=R(i) \times (J \times N)+C(i)+J \times (i-1), \text{ where } (R(i), C(i))(0 \leq R(i) \leq (K-1) \text{ and } 0 \leq C(i) \leq (J-1))$$

represents row and column position in the i-th data block, and s $(0S \leq (J \times K \times N)-1)$ represents an order in which bytes in all data blocks sequentially are written to said storage medium.

7. The method according to claim 6, wherein J is 182 and K is 208.

8. A method for processing digital data for use with a storage medium, comprising the steps of:

arranging input digital data so as to form a pair of data blocks of a predetermined matrix form, wherein each of said pair of data blocks is formed by using the following equations:

$$i = b/X \text{ and}$$

$$j = b - (X \times i),$$

where i and j ($0 \leq i \leq (Y-1)$ and $0 \leq j \leq (X-1)$) represent row and column position in each data block of (X×Y)-byte size, respectively, where b ($0 \leq b \leq (X \times Y)-1$) represents an order in which the bytes in said sequential input data of (X×Y)-byte size are inputted, and where X is 172 and Y is 192;

appending an outer parity of a predetermined size and an inner parity of a predetermined size to each column and row of each of said plurality of data blocks, respectively; and combining said plurality of data blocks as appended into one ECC (Error Correction Code) block by writing sequentially rows having the same row number in the pair of data blocks, to the storage medium.

9. The method of claim 8, further comprising:
interleaving rows including the outer parity separately at a position after a predetermined row for each of said pair of data blocks in said appending step.

10. The method of claim 9, wherein the step of writing sequentially rows includes:
writing sequentially the rows having the same row number in said pair of data blocks re-arranged in said interleaving step, to the storage medium.

11. The method of claim 10, wherein the predetermined modulation algorithm converts 8 bits to a given bit, the given bit being larger than 8 bits.

12. The method of claim 11, wherein said outer parity is 16-byte long in each column and said inner parity is 10-byte long in each row.

13. The method of claim 8, wherein said appending step comprises of the sub-steps of:
appending said outer parity of a predetermined size to each column of each of said pair of data blocks in the column direction; and
appending said inner parity of a predetermined size to each row of each of said pair of data blocks outer-parity-encoded in said outer parity appending step in the row direction.

14. A method for processing digital data for use with a storage medium, comprising the steps of:
arranging a sequential input digital data so as to form a pair of data units of a predetermined matrix form, each data unit having size of 172×192 bytes;
appending an outer parity of a predetermined size and an inner parity of a predetermined size to each column and row of each data unit, respectively; and
combining the pair of data units having the appended outer parity and inner parity into one ECC (Error Correction Code) block by reading out sequentially rows having the same row number in the pair of data units and recording the read-out rows having the same row number as one row of the ECC block.

15. The method of claim 14, further comprising:
interleaving rows including the outer parity separately at a position after a predetermined row for each data unit in said combining step.

16. The method of claim 15, further comprising:
modulating the digital data by a predetermined modulation algorithm; and
writing the modulated data of rows having the same row number in said pair of data units re-arranged in said interleaving step, to the storage medium sequentially.

17. The method of claim 16, further comprising:
appending a predetermined sync code to the modulated data in the modulating step, and then performing-the writing step of writing the sync code and the modulated data.

18. The method of claim 17, wherein the predetermined sync code of 4 columns is appended within the ECC block before the writing step.

19. The method of claim 14, wherein 16 rows including said outer parity are appended to each data unit and 10 columns including said inner parity are appended to each data unit.

20. The method of claim 19, wherein the one ECC block has a size of 364×208 bytes.

21. A storage medium having a data structure of ECC (Error Correction Code) block for an error correction,
wherein the ECC block is constructed by arranging input digital data so as to form a pair of data units of a predetermined matrix form, appending an outer parity of a predetermined size and an inner parity of a predetermined size to each column and row of each data unit, respectively, and combining the pair of data units having the appended outer parity and inner parity into one ECC block to perform an error correction using the ECC block,
wherein each row including the outer parity separately is interleaved at a position after a predetermined row for each data unit, the digital data of each data unit is modulated by a predetermined modulation algorithm, and the modulated data of rows having the same row number in said pair of data units are sequentially recorded.

22. The storage medium of claim 21, wherein the arranged each data unit has size of 172×192 bytes respectively.

23. The storage medium of claim 21, wherein a predetermined sync code is appended to the modulated data, and then the sync code and the modulated data are recorded together.

24. The storage medium of claim 23, wherein the predetermined sync code of 4 columns is appended within the ECC block before the recording of the modulated data.

25. The storage medium of claim 21, wherein 16 rows including said outer parity are appended to each data unit and 10 columns including said inner parity are appended to each data unit.

26. The storage medium of claim 25, wherein the one ECC block has a size of 364×208 bytes.

27. A storage medium comprising:
an error correction code (ECC) block stored on the storage medium, the ECC block having a size greater than 172×192 bytes and having rows of outer parity interleaved with rows without outer parity, wherein the ECC block is constructed by combining a pair of ECC sub-blocks, the combining involving reading out sequentially rows having the same row number in the ECC sub-blocks and recording the read-out rows having the same row number as one row of the ECC block.

28. The storage medium of claim 27, wherein the ECC block has a size of 364×208 bytes.

* * * * *